Figure 1:
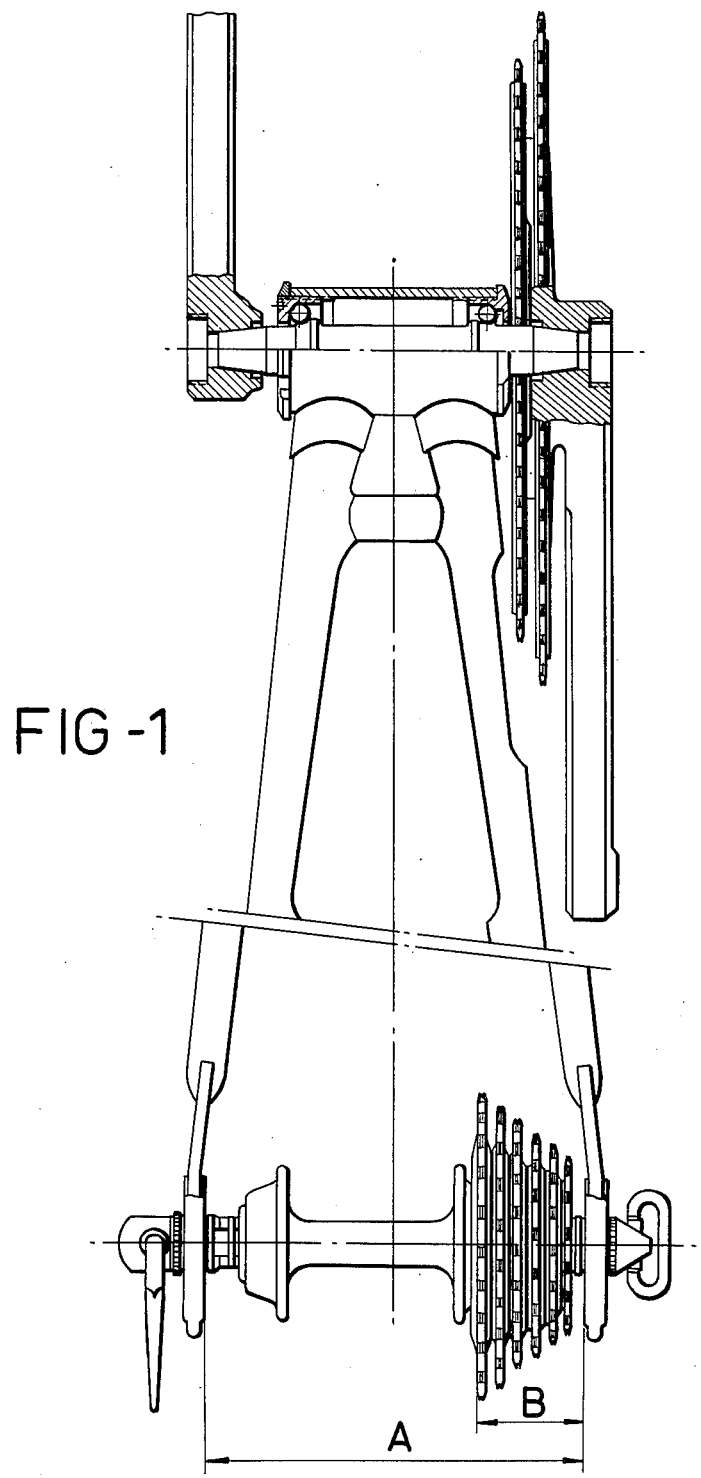

United States Patent [19]

Arregui Suinaga

[11] 4,121,474
[45] Oct. 24, 1978

[54] MULTIPLE CROWN FREE WHEEL SYSTEMS FOR BICYCLES

[76] Inventor: José Domingo Arregui Suinaga, Zubigain 1-2-°, Eibar, Spain

[21] Appl. No.: 490,107

[22] Filed: Jul. 19, 1974

Related U.S. Application Data

[63] Continuation of Ser. No. 295,180, Oct. 5, 1972, abandoned.

[30] Foreign Application Priority Data

Oct. 23, 1971 [ES] Spain .................................. 396.325

[51] Int. Cl.² ........................ F16H 9/24; F16H 11/08; F16H 55/30
[52] U.S. Cl. ............................... 74/217 B; 74/243 R
[58] Field of Search ........................ 74/243 R, 217 B; 192/64

[56] References Cited

U.S. PATENT DOCUMENTS

| 3,492,883 | 2/1970 | Maeda | 74/217 B |
| 3,648,519 | 3/1972 | Nakata et al. | 74/217 B |
| 3,661,021 | 5/1972 | Ohshita | 74/217 B |

FOREIGN PATENT DOCUMENTS 491,109  8/1938  United Kingdom .................. 74/217 B

OTHER PUBLICATIONS

"The Handbook of Cycl-ology", Wheelgoods Corporation, Minneapolis, Minn., 55408, pp. 32 & 55, year 1969.

Primary Examiner—Samuel Scott
Assistant Examiner—W. R. Henderson
Attorney, Agent, or Firm—Brumbaugh, Graves, Donohue & Raymond

[57] ABSTRACT

A multiple crown free wheel system for bicycles comprises a core having a cylindrical external surface of generally constant diameter in which there are a series of canals. Each crown is provided with a series of ribs in its inner periphery, complementary to the canals of the core and in the same number, so that the crowns may be assembled and keyed on the core by sliding them axially onto the core, one after the other. A flange standing up from the surface of the core coincident with the annular salient of its rear mouth serves as a penetration block for the various crowns. Each crown increases uniformly in cross-sectional thickness from a zone beneath the base of the teeth to a maximum thickness.

1 Claim, 35 Drawing Figures

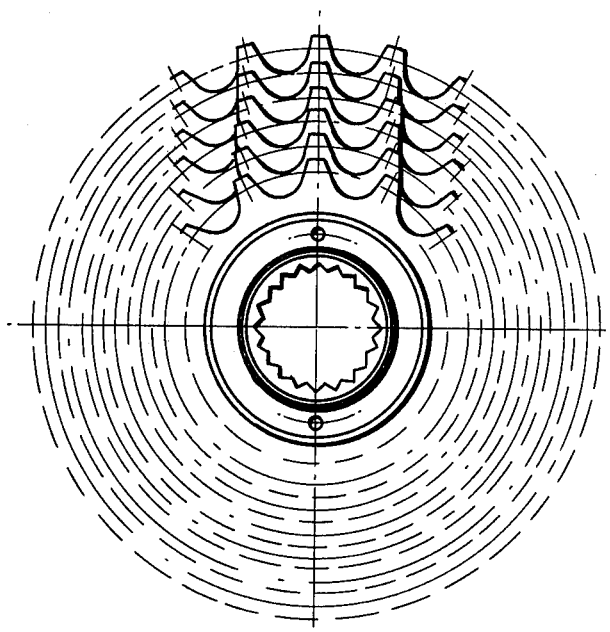
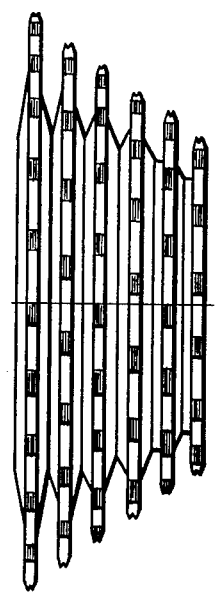
FIG-3    FIG-4
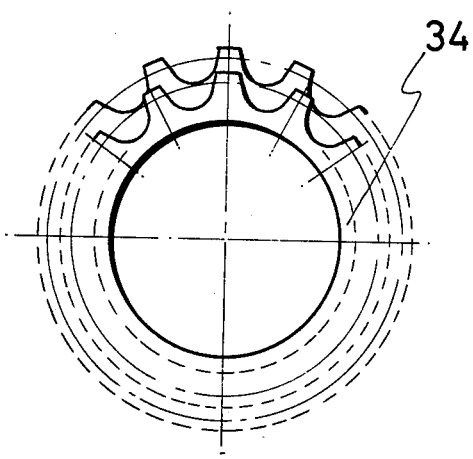
FIG-13    FIG-14
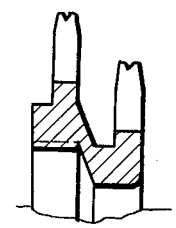
FIG. 14A

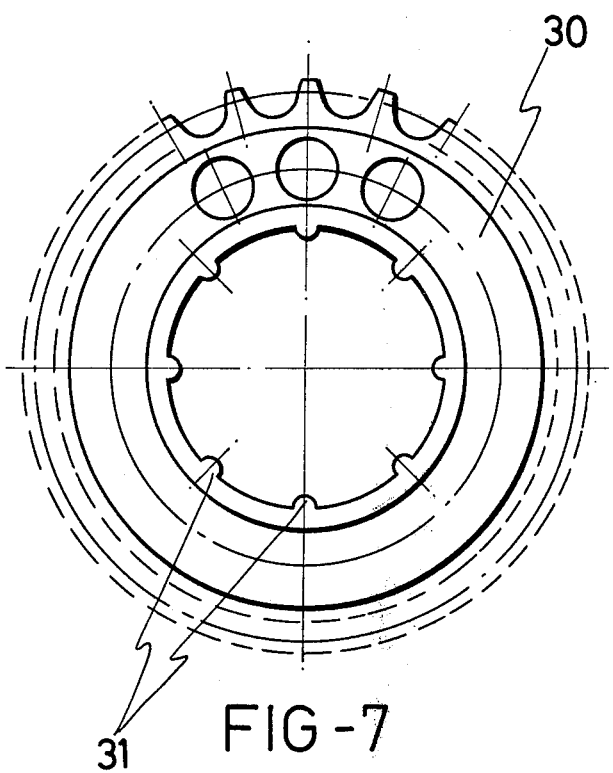
FIG-7   FIG-8
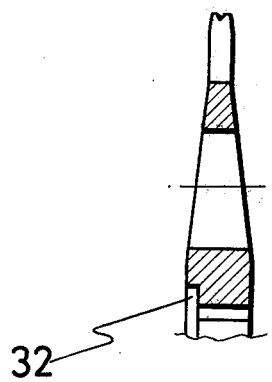
FIG. 8A

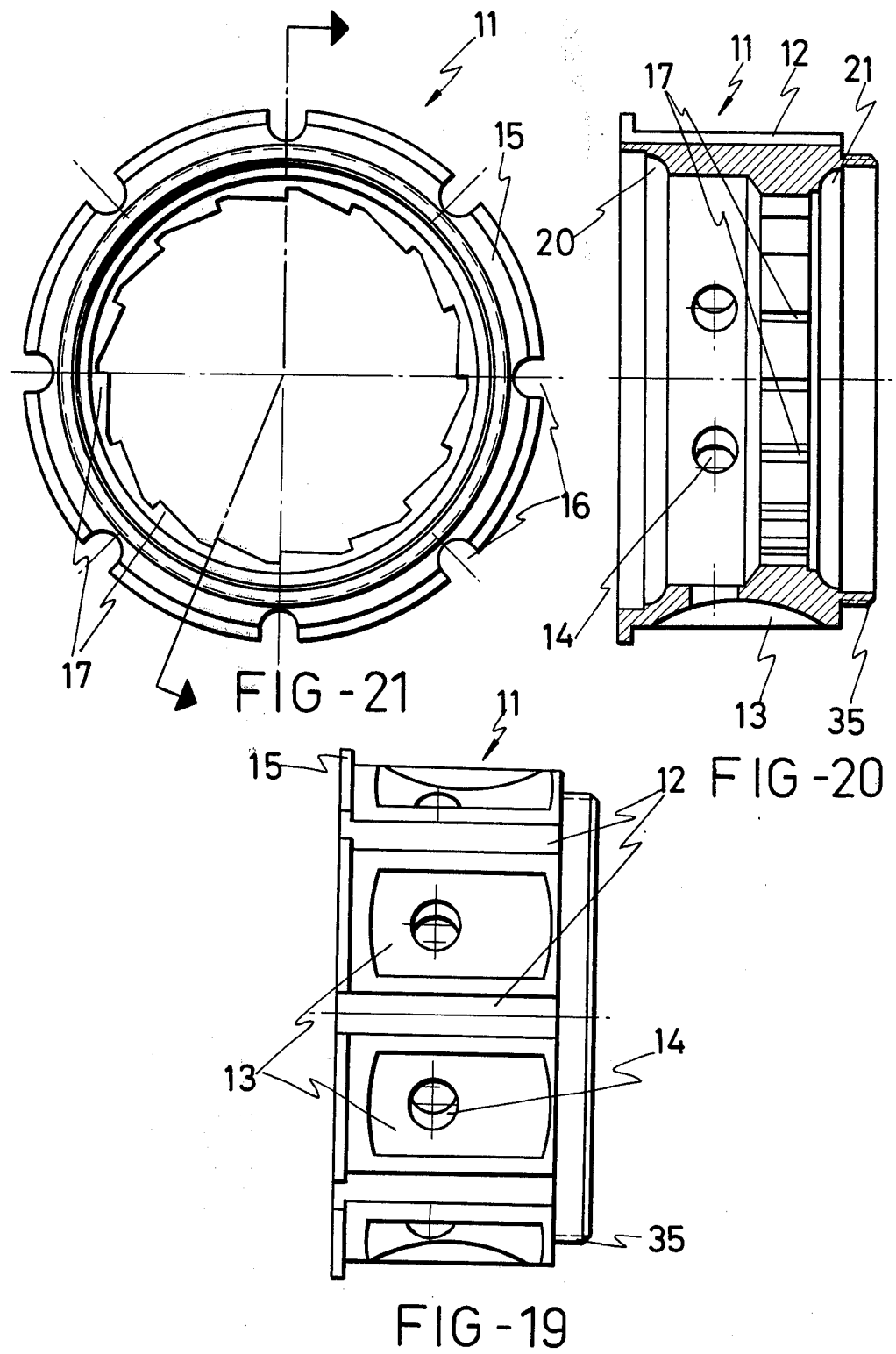

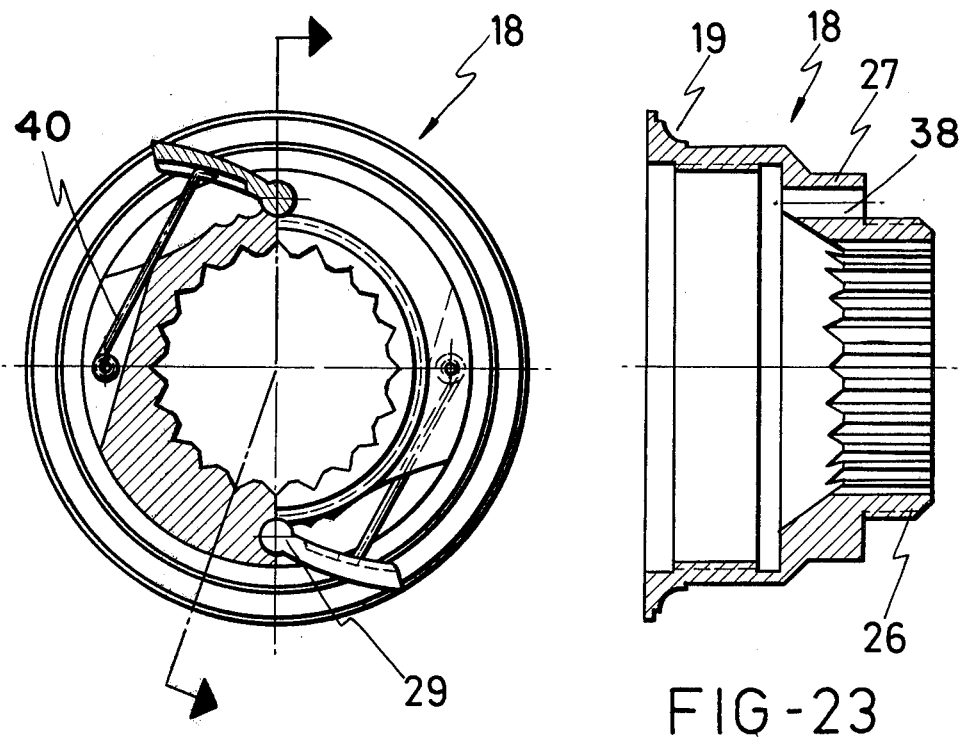
FIG-24
FIG-23
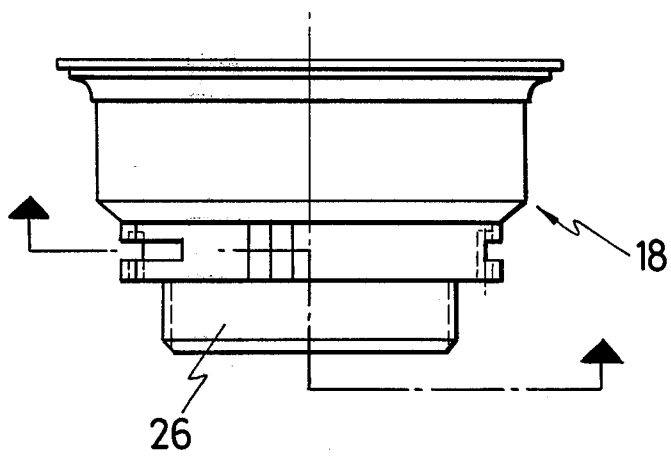
FIG-25

MULTIPLE CROWN FREE WHEEL SYSTEMS FOR BICYCLES

This is a continuation of application Ser. No. 295,180, Oct. 5, 1972, now abandoned.

This invention refers to a number of improvements in the constitution of components of the free wheel device on most bicycle driving wheels.

As is known, a free wheel in cycling terms designates a pinion mounted on the axle of the rear wheel which is activated by spring pressed pawls, which pawls simultaneously adjust in the inner toothed area of the pinion proper, while the bicycle pedals are in movement, thus transferring power by means of the chain, to said pinion. The pinion drive ceases when pedalling stops; not, thereby, the turn of the driving wheel. Based on said principle, there are free wheels of varying speeds; that is to say, devices are known which are formed by a core on the outside of which are multiple sprockets adjacent to each other, while said core is fitted to another interior body with interposition of balls constituting a type of bearing or bushing in such a way that both bodies forming the core are constituted as a free wheel properly speaking, naturally in cooperation with the aforesaid pawls.

The core to which the pinions are fitted has a structure determined by cylindrical areas coaxially staggered, each of which is appropriately threaded.

Normally a free wheel which admits up to six pinions has its core formed by three gradations the outer diameter of which, beginning with the lesser of these, steadily increases. The larger of said gradations is separated from the other two by an annular flange which generally emerges from the surface of the core itself, which flange has a maximum diameter of the part. Under such arrangement, the gradation with the larger section is threaded in a direction contrary to that of the screw threads in the remaining cylindrical areas, so that the indicated flange becomes the tightening block on both faces for all the pinions. Thus, crowns are mounted by screwing them on what we might call the lesser base of the core, while at least one other crown is fitted on the outer or larger face of the core itself. Said crowns, as is known, have the shape of a ring, generally flat, which has teeth on its outer peripheral rim, while it has screw threads on its corresponding inner rim.

The structure of the free wheels with multiple crowns such as those cited has the serious drawback that the various pinions which can be mounted with a number of teeth generally between 13 and 26 each, do not have the same size internal diameter. That is to say, combinations have to be made of the various functions of the gear train, bearing in mind the internal diameter of each crown. This requires having, for example, several crowns of 18 teeth with various internal diameters, so that same may be mounted on one or the other of the gradations constituting the wheel core.

The stated prior art offers grave problems when it becomes necessary to replace one of the pinions mounted on a given free wheel in service, since it is necessary to loosen them one by one until the one to be replaced is reached. The same problem results from the need to change the gear ratios. That is to say, to arrange a gear train for a mountainous leg, for example, to replace one which has just been used for cycling over level terrain.

The operations indicated in the preceding paragraph are truly frequent in major professional cycling contests, so that mechanics in charge of this task usually perform the work by having a bench screw on which they fasten a pair of rigid rods crossing two diametrically facing orifices of the wheel web corresponding to the spool of the driving wheel, anchoring same by means of a skillfully placed blow to the core in the direction of rotation. This causes loosening of the free wheel ensemble. The operation is then performed of extracting, for example, the damaged pinion or crown so that it may be replaced, or otherwise, arranging the various pinions according to the cycling course in question. In said conditions it is usually the case that the operation of loosening the free wheel causes fracture of the spool, the compulsory replacement of which is extremely difficult to effect, as any expert knows.

The problems noted derive from the anachronistic construction of current cores around which the pinions are grouped.

It is also worthy of emphasizing the importance of the weight of the various parts of a bicycle, particularly when races are involved. Therefore, bicycle parts have been the subject of steady improvement with a view to reducing their weight without the necessary resistance being diminished. However, insofar as free wheels, all attempts to date have been frankly discouraging, since the freewheel is subjected to demands which hamper its weight reduction. Said demands are basically two:

1. High degree of sturdiness and strength.
2. Measurements within very strict limits.

The first of these conditions, e.g., that of strength of the device is logical, since the pinions and the body on which these are mounted must bear the tremendous efforts of the cyclist, without risking a minimum possibility of breaking. With regard to the measurements of the free wheel insofar as its length, or rather the thickness thereof, it is necessary to adhere to the distance between the extreme of arms constituting the rear fork of the frame of any standard bicycle, approximately 124 mm. For said reason, all free wheels known have a maximum thickness of 30 mm. naturally within the six pinions which can be incorporated thereto.

These two conditions which must coincide in a bicycle gear train make it compulsory to construct same, cores and pinions, of materials such as iron or steel which provide an extremely heavy end product. Experiments conducted to date with respect to utilizing other, lighter materials such as aluminum or one of its alloys, for example, have merely been for making crowns or pinions, but due to a number of circumstances, results obtained have precluded progress in that sense.

In effect, due to the measurements which a maximum base train of six pinions must have (approximately 30 mm.), thickness thereof is limited and consequently a light material such as aluminum or Dural is not sufficiently resistant to torsion and therefore, pinions thus obtained broke precisely at their threaded necks. It is not possible to increase the conventional thickness of pinions since maximum six-speed ensembles cannot then be utilized and this possibility of utilizing material lighter than iron was not feasible.

However, in a free wheel according to the invention it is possible to utilize Duraluminum pinnions with thicknesses appropriate for forming gears of up to six speeds; that is, the pinions constituting the object of the invention have the thickness of the conventional iron pinions, but offer the particularity that instead of being threaded to the core they are keyed in a special way to same. With said structure there is obviated the problem resulting from the slight number of screw threads in aluminum or Dural parts which resulted in breaking and, until now, were insuperable.

As opposed to conventional cores, the core itself, always in accordance with the invention, is constituted by a constant external section cylinder in which there are a number of canals equidistant from each other, produced according to their generator, preferably in half-round sections. Said canals, at the same time that the core has, in coincidence with the peripheral annular edge of its rear, a flange normal to the side surface of said core to serve as a penetration block for the various pinions which, being provided with complementary ribs of the canals in the outer area of the core, are mounted to slide axially, one after the other.

In these conditions it is obvious that all the crowns will have an identical inner diameter and their extraction and/or mounting is extremely easy to effect as long as the pinions are retained in position by means of a washer to serve as a cover, threaded to a body concentrically fitted in the interior of that carrying the pinions in a mamner similar to that in which it has been to date. It is precisely between such two hollow concentric bodies constituting the core that the conventional annular groups of balls will be situated; these will constitute the supports so that the free wheel may turn freely when pedalling is not being accomplished, or to pull the inner body when there is traction in the geared chain in any of the pinions, naturally with the cooperation of the conventional pawls.

As is logical, the aforesaid inner body shall be tied to the spool from which the spokes emerge by means of a thread, thus a rolling ensemble is formed through the spokes joining the spool to the wheel tire.

Another major feature of the invention is the fact that the races for the balls constituting bearings are practically at the extremes of the assembly; that is to say, in the neighborhood of the mouths of the set formed by the two bodies which, when concentrically fitted, constitute the core. Further, it is a particularity that said two groups of balls are practically within the same horizontal plane. That is to say, each annular or bearing group has the same diameter approximately, as opposed to what has been the case to date, since said two annular groups of balls in the conventional free wheels are gradated, e.g., one at a different level from the other. Through the special arrangement of the groups of balls just cited, according to the invention, there is achieved greater regularity in rolling and in the pull caused by chain traction, this redounding to the benefit of the free wheel ensemble.

Other structural characteristics and beneficial effects of the invention will be more clearly detailed in describing same according to the set of plans attached, wherein the various figures show examples of preferred practical execution which are not meant to be a limitation as to the real possibilities, since the mentioned plans are of a purely illustrative and complementary nature to enable description.

The following are shown in the mentioned plans:

FIG. 1. Plan view of the rear fork of a conventional bicycle showing location of the drive wheel shaft with multiple crown or speed free wheel.

Figure 2:
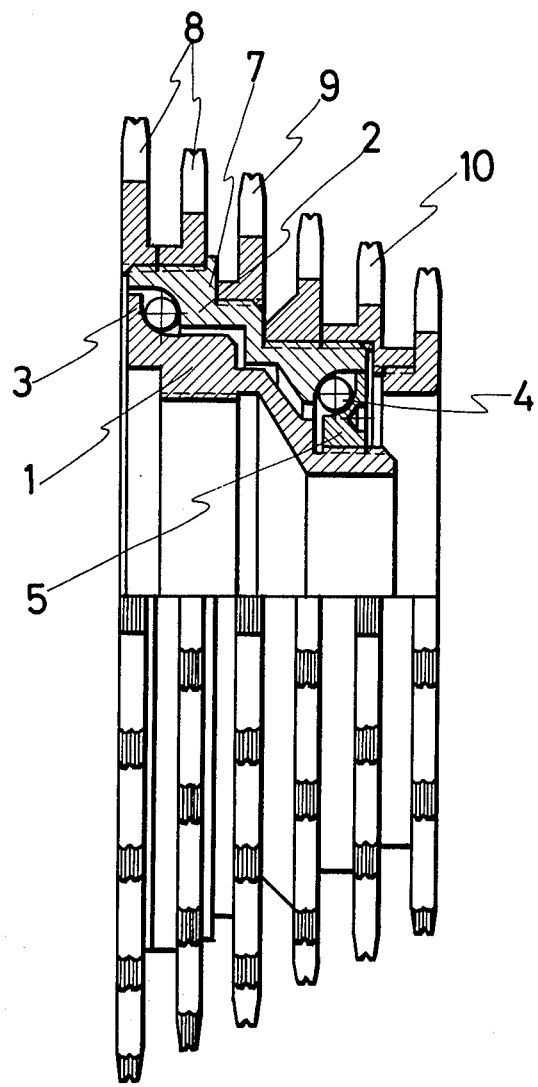

FIG. 2. Corresponds to a partially sectioned elevation of a six-speed free wheel according to the construction employed to date in manufacturing these devices.

FIG. 3. Corresponds to a front elevation of a free wheel according to the invention.

FIG. 4. Represents a lateral elevation of the same six-speed free wheel appearing in FIG. 3.

Figure 5:
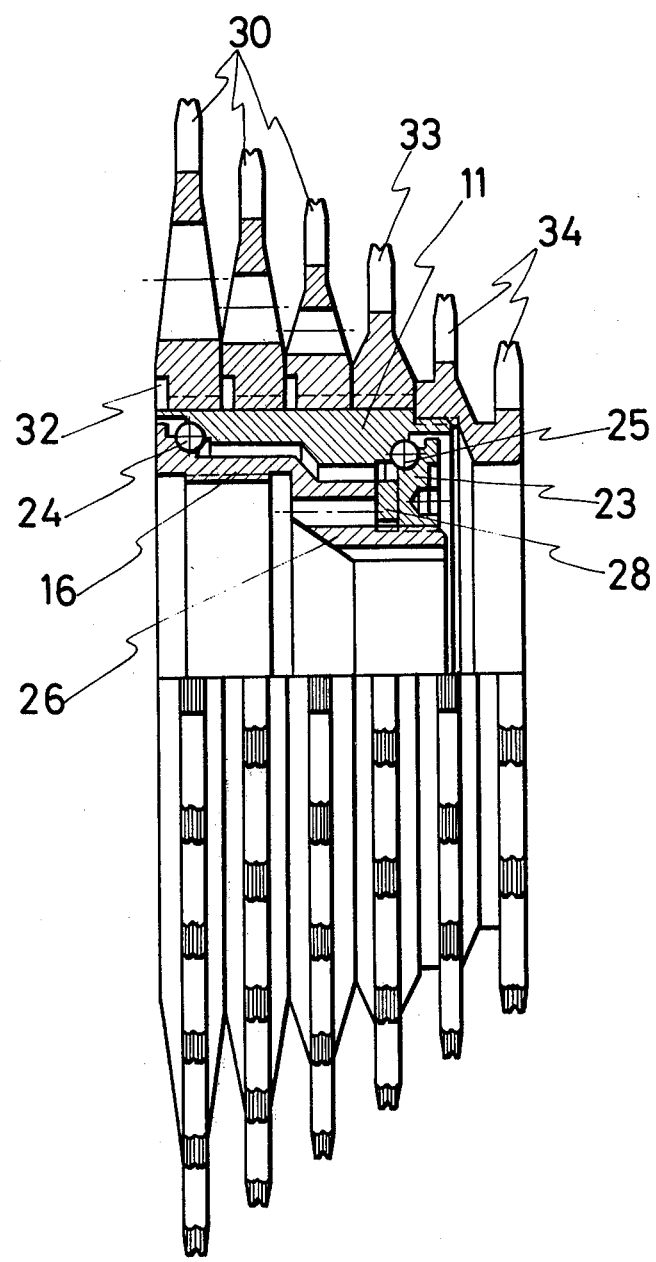

FIG. 5. Partially sectioned elevation of the proposed free wheel in which can be seen the differing structure with respect to the conventional device shown for the same purpose in FIG. 2.

Figure 6:
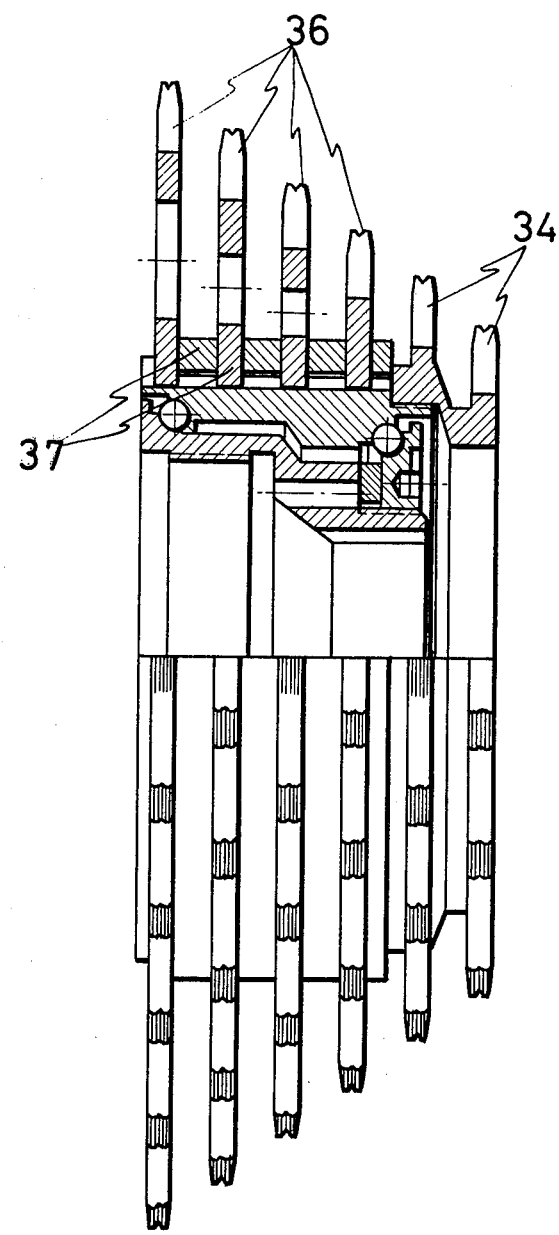

FIG. 6. Shows a quarter sectioned lateral elevation of a variation for executing the free wheel which is the object of the invention, with respect to execution shown in the preceding figure.

FIG. 7. Corresponds to a front elevation of one of the crowns which will form the gear train according to the invention.

FIGS. 8 and 8A. Lateral elevation of the same crown shown in FIG. 7.

Figures 9, 10:
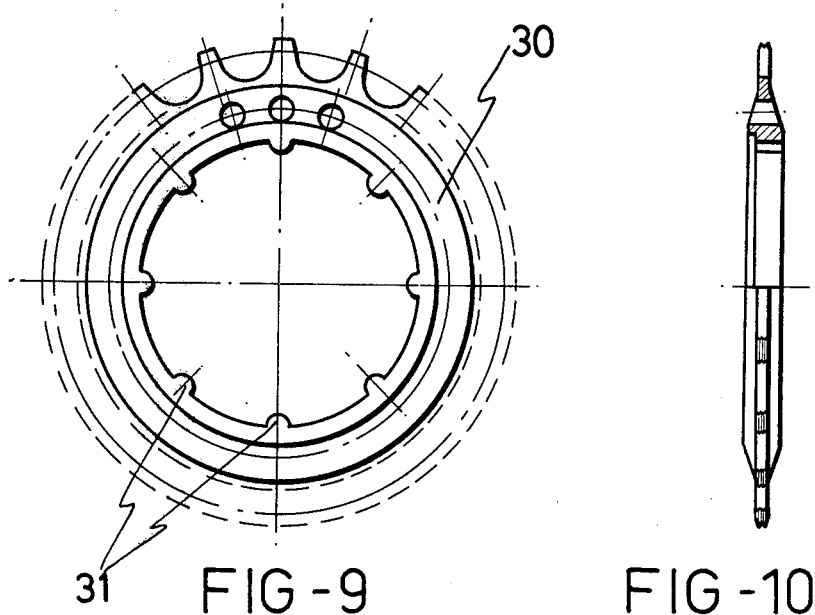

FIG. 9. Shows a front elevation of a crown with the features of the invention which, while similar to that shown in FIG. 7, has less teeth than the other.

Figures 10A, 12A:
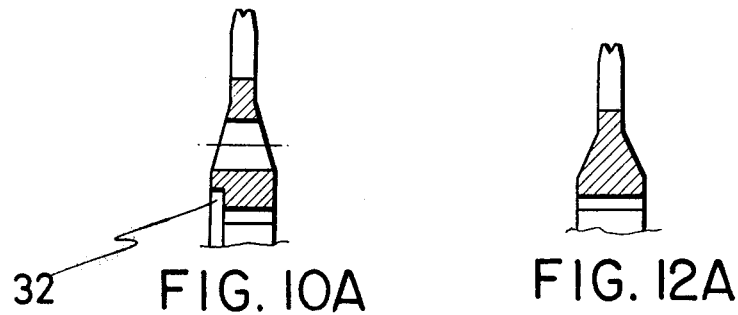

FIGS. 10 and 10A. Partially sectioned lateral elevation of the crown shown in FIG. 9. It is pertinent to note that the crowns shown in FIGS. 7 to 10 will be those having a number of teeth which can be considered intermediate with respect to possibilities for development of crowns with a maximum of teeth.

Figures 11, 12:
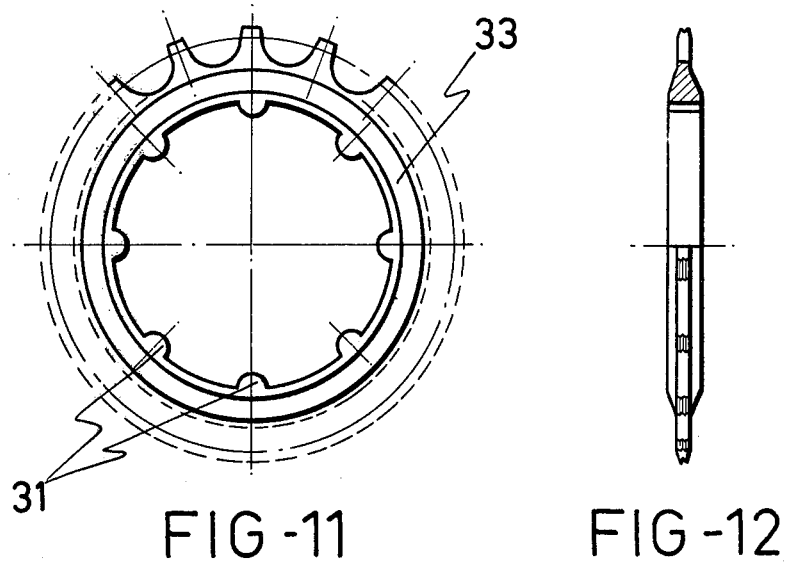

FIG. 11. Front elevation of a crown according to the invention, of the type that will be placed toward the outer extreme of the free wheel.

FIGS. 12 and 12A. Sectioned lateral elevation of the same crown shown in FIG. 11.

FIG. 13. Corresponds to a front elevation of a dual crown arranged for fitting at the outer extreme of a core according to the invention, specifically on a short neck emerging axially at the inner mouth of the same core.

FIGS. 14 and 14A. Sectioned lateral elevation of the dual crown shown in FIG. 13.

Figures 15, 16:
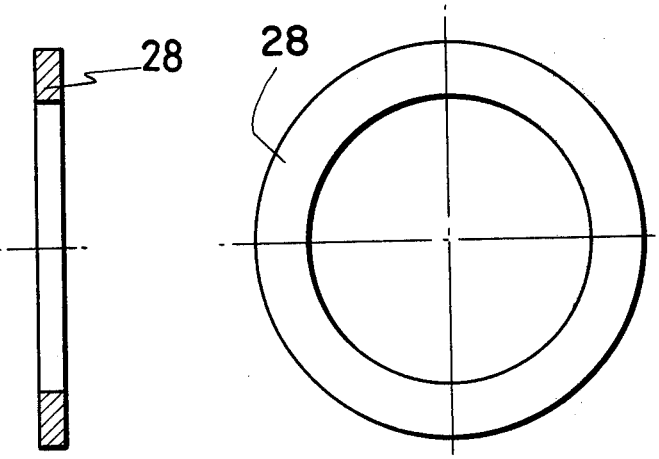

FIG. 15. Front elevation of a washer coaxially situated on the core, which will serve as a separator between the internal body in order to prevent excessive tightening of one of the bodies of the core with respect to the other, which would thus inconveniently press upon the balls constituting bearings.

FIG. 16. Transversal section of the washer shown in FIG. 15.

Figures 17, 18:
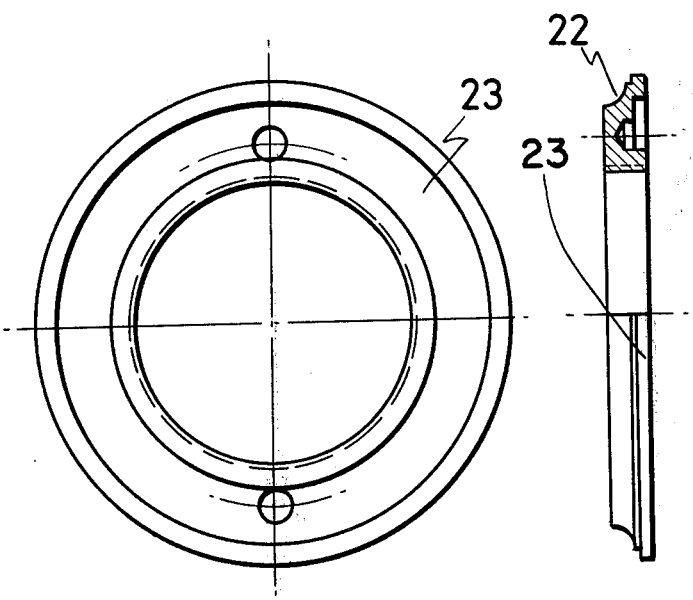

FIG. 17. Front elevation of the type of cover which, screwed to the inner body forming the core, will fasten all of the various component parts.

FIG. 18. Quarter sectioned lateral elevation of the same part shown in FIG. 17.

FIG. 19. Lateral elevation of the part or cap-like cylinder forming the outer portion of the core, which will receive axial sliding of the various crowns forming the gear train.

FIG. 20. Transversal section of the part shown in FIG. 19.

FIG. 21. Rear plan of the part shown in FIGS. 19 and 20.

Figure 22:
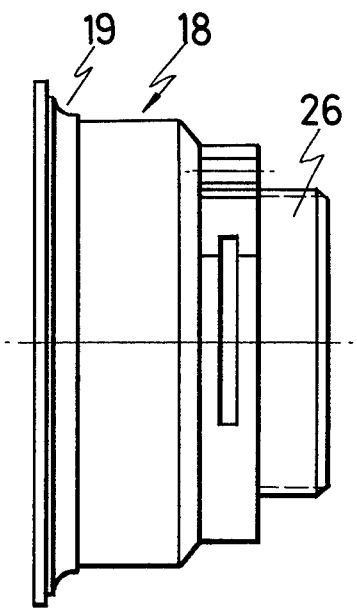

FIG. 22. Lateral elevation of the part forming the internal portion of the core which shall specifically be located concentrically inside the part shown in FIGS. 19, 20, and 21.

FIG. 23. Transversal section of the part shown in FIG. 22.

FIG. 24. Rear plan of inner part shown in FIGS. 22 and 23.

FIG. 25. Detail of front portion of inner part forming the core.

Figures 26, 26A:
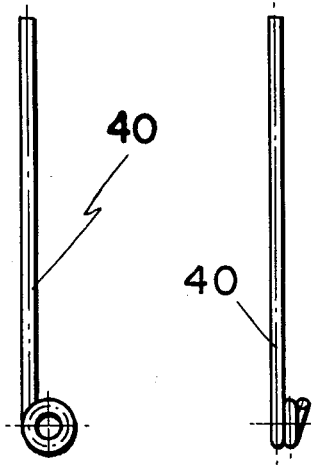

FIGS. 26 and 26A. Shows springs in two turning positions at 90° respecting each other. These determine the pull which will occur on pawls appropriately fitted in the inner part forming the core.

Figure 27:
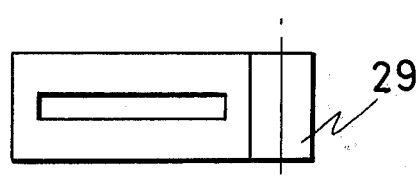
Figure 27A:
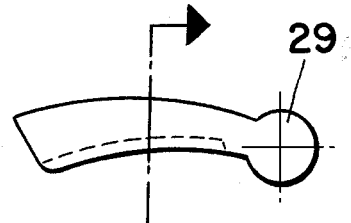
Figure 27B:
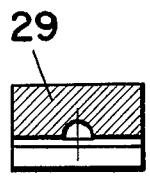

FIGS. 27, 27A and 27B. Shows several plans, lateral and front elevations, respectively, of each of the pawls to be incorporated on this type of free wheel.

Figure 28:
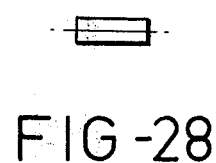

FIG. 28. Shows any of the shafts on which the springs shown in FIG. 26 will be situated. The free extremes will act on the pawls in FIG. 27.

As can be seen by observing FIG. 1, distance A shows the maximum dimension which can exist between the extremes of the arms forming the rear fork of the bicycle frame, between which the shaft of the drive wheel will be installed.

Naturally, said shaft will incorporate the free wheel provided with sufficient pinions for the various developments, with the particularity that the maximum distance shown under B in FIG. 1 is also compulsory and shall not exceed 32.5. mm.

Considering such measurement requirements, the object of the invention has been designed so that it can be utilized on any conventional bicycle having the indicated dimensions.

FIG. 2 shows a conventional free wheel according to a quarter sectioned elevation, in order to establish a comparison of the structure of the various parts constituting same, it having like parts and even the ensemble of the proposed free wheel. As will be noted and in accordance with that stated at the beginning of this report, a conventional free wheel is constituted by concentrically fitting two bodies, generally referenced 1 and 2, between which will be formed what we might term races, in order to receive two groups of balls referenced 3 and 4, so that same serve as sliding supports for rotating movement which body 2 might have with respect to 1. Also between said bodies 1 and 2, there will be a pawl device, not shown in order to complicate the drawings, which will enable pull of the body 1, when a transmission chain is propelled by the cyclist, naturally geared in any of the crowns of the free wheel, while, if pedalling ceases, the body 1, conveniently fitted to the bushing or shaft fitted to the drive wheel, can turn without body 2 and crowns threaded thereto doing likewise.

Note that the cited ensemble formed by bodies 1 and 2 are related to each other by a cover referenced 5, which is screwed to an extreme neck formed in one of the gradations of inner body 1.

This body 1 also has inner screw threads for fastening to the shaft incorporated to the drive wheel spool.

Note that body 2, as has been stated previously, is formed by at least three gradations so that the gradation with the largest diameter has a peripheral flange numbered 7, which will constitute the limiting tightening block of crowns 8, assembled by screwing same on said largest diameter gradation by the rear part of the free wheel ensemble. Meanwhile, another series of crowns 9, 10, etc, will be situated on the various gradations on the front face or that of lesser section of the same free wheel ensemble.

It will be noted that the bearings forming balls 3 and 4 are situated on levels markedly divergent from each other. This is not conductive to proper rolling of the ensemble which, as is known, is subjected by the cyclist to severe stress during pedalling.

Notwithstanding, as has been stated, it will be necessary to have various types of crowns which, having the same number of teeth, can be distributed on the different gradations of body 2, depending on the needs for developing the gear train.

Observing FIGS. 19, 20 and 21, it is pertinent to note that the part represented is that which, on a free wheel according to the invention, will replace that indicated in FIG. 2 as number 2 just mentioned. Note that said part, generally shown under 11, is conformed according to a cylinder having in its generator direction a series of grooves referenced 12, preferably with a half-round bottom. Among said grooves there are a series of intermediate spaces referenced 13, merely of lightened materials, the task of orifices 14 equally being to lighten the weight. These are noted precisely in said sunken spaces 13. Toward one of the peripheral edges of the mentioned cylinder generally referenced 11, there is specifically in coincidence with said peripheral edge, an annular flange identified by reference 15, which performs similarly to flange 7 shown in the drawing of the conventional free wheel in FIG. 2. However, with respect thereto, it occupies a non-intermediate position and rather is displaced toward on of the extremes or bases of cylinder 11. Note that there are arched recesses on said flange which are the exit of canals referenced 12, their purpose being none other than to lighten even more, if possible, the weight of the ensemble.

The stated part 11 has the feature that it has a series of teeth inside referenced 17, dressed so that the pawls which will constitute the mechanism of the free wheel properly stated may function.

The part whose structure has just been stated will be made of a special steel highly alloyed, due to the fact that in order to obtain a high reduction in weight over the conventional systems, it has been necessary to reduce the sections to the maximum, whereby same are subject to great stresses, it thus being necessary that they have an adequate resistance to traction. The part shown in FIGS. 22, 23 and 24 will also be made of the same material and will be specifically placed inside the part shown in FIGS. 19, 20 and 21, so that between same will be shaped the races for balls to constitute the bearings which enable support and turning of one of the parts respecting the other, either freely or by pulling the one outside toward the one inside, when the moving direction favors actions of the pawls which, as can be seen in FIGS. 20 and 21, will be properly engaged by the teeth 17, dressed in a given area of the inner face of part 11.

The complement of the external part referenced number 11 which is generically referenced 18 in FIGS. 22 to 25, is a body with a generally circular shape having successive staggering from one extreme in which there is a semi-race with concave bottom marked 19, between which and the also concave area marked 20 in par 11, there will be annularly arranged a group of balls such as those marked 24 in different figures, while another group of balls similar to the above, indicated with number 25 in other figures, will rest on the semi-races originating concave area 21 located near the forward mouth of part 11, and another semi-race referenced 22, which pertains to the washer or cover 23, which will be screwed to the forward extreme 26 of part 18, so that through said sort of washer or cover 23, bodies 11 and 18 will be fastened.

Note that between the cited cover 23 and annular gradation 27 forming part of component 18, there will be a washer 28 which will enable accomplishment of tightening cover 23 on the neck 26, that the balls forming bearings 24 and 25 will not be unduly pressed.

By means of said structure and fitting of the various parts commented on, the central core is achieved according to the invention. FIGS. 5 and 6 show it perfectly assembled.

It is pertinent to note that on one of its gradations the part or internal cap 18, specifically part 27, has housings, preferably diametrically opposed, referenced 38, in which fitting of each of the pawls 29 will take place. These are constantly urged toward their more salient position by action of the springs 40 governing each of said pawls 29.

The free wheel ensemble thus formed is capable of receiving a series of crowns with special structural features which can be noted in FIGS. 7 to 12. In effect, there are crowns indicated under 30 in which, independently of the number of teeth they have, offer the particularity as shown in example in FIGS. 7, 8, 9 and 10, that they are made of DURAL; they have inside their corresponding periphery a series of ribs referenced 31, which are shaped complementary to the canals 12 made on the side of part 11. It is easily understood that the number of ribs 31 with which each crown 30 will be equipped will be the same as the canals carved on the side of part 11, so that assembling is thus achieved which might be termed by keying, the various crowns 30 about flange 15 and each other as the crowns are placed on part 11 and of the various crowns 30 will constitute a block. Note that said type of crowns 30 have a recess on one face indicated by number 32 which has a depth equivalent to thickness of the stated flange 15 pertaining to part 11 so that there is thus obtained, when assembling any of the crowns against said flange, the levelling thereof respecting the crown which will form the rear part of the gear train.

Naturally, aside from lightening the weight of the ensemble, said recess 32 permits maintaining the approximately 30 mm. measurement which should be the maximum width of a six-speed free wheel.

There are, however, other type 33 crowns shown in FIGS. 11 and 12, which maintain the structure with respect to incorporation of ribs 31 form keying with canals 12 of part 11, do not have a recess in one of their faces or bases, since this type of crown or pinion 33 will have a number of teeth such that they have to be fitted to the front part of the free wheel, e.g., toward the outer mouth of same.

It is pertinent to note, lastly, that pinions with less teeth such as those referenced 34 in the various figures, will be constituted in one part only; that is to say, this will be a dual crown, the two component parts or outer peripheral toothed discs will be made in one and the same part, so that this ensemble may be screwed to the neck referenced 35, which is a projection from the forward or opposite mouth to flange 15 of the same part or outer cap 11 forming the core of the wheel 15. It should be emphasized that on a free wheel according to the invention perhaps only the pair of crowns 34 having less teeth, that is to say, the ones permitting broader developments of the bicycle, are those which do not have the basic structure of other crowns, since these 34, do not have ribs 31, for they will not be fitted by keying to the principal part of component 11.

Lastly it should be pointed out that the various type 30 or 33 crowns, in the area for fitting to part 11, considered on transversal section, a greater thickness than that in the peripheral part where teeth constituting the pinion or gears are formed. Note that the transition area between said teeth and the central part of each pinion is achieved by a truncated cone component. Naturally this increase in thickness enables greater resistance to breaking. Likewise, it would not be possible to maintain internal thickness of the crowns 30 or 33, since it is necessary to maintain a separation between the teeth of adjacent crowns in correspondence with the transmission chain from the bicycle pedals.

Nevertheless, a variation for execution has been provided as shown in FIG. 6 which consists in that each one of the crowns referenced in said Figure as part 36, be formed simply by plates identical in nature or material to these forming the previous crowns, but with the particularity that in assembling these totally flat or parallel face crowns 36 on the corresponding part or core 11, a washer 37 will be placed between every two crowns 36, to limit approach of each crown to another.

Naturally this variation of execution retains all the fundamental characteristics insofar as structure of the core, and as to the manner of fitting the crowns to said core, which is also effected by keying, due to the fact that said crowns 36 logically have ribs 31 capable of being fitted to canals 12 of part 11. Naturally, in the variation of execution we are discussing, crowns 34 may also be situated, the structure of which has already been described.

From all that herein has been stated it is easy to grasp the great usefulness of this type of free wheel, since replacement of pinions or assembly of various developments different from the one in use will only require unscrewing the pair of crowns 34, i.e. the dual crown formed by same, and then extracting by sliding the crowns 30 and interchanging or replacing those successively fitted crowns until a desired block is formed with the outer flange of the external cap completing the core.

A special tool in the form of pliers or tongs comprising two levers joined in the centre by a shaft which will, at the same time, be the rotating shaft should be used to effect the operation of unscrewing the forward crowns or those with less teeth 34. One of the ends of both levers will be joined by a piece of chain having 6 loops.

To effect the unscrewing of the pair of crowns 34, one of the levers will be geared with the teeth of same, by the part being the joined chain. The other lever will be geared with crown 33.

By putting pressure on the two free ends of both levers in the conventional way of grasping a portion with a pliers or tongs, the pair of crowns 34 will be automatically unscrewed.

On this point it is pertinent to emphasize that a six-speed free wheel according to the invention has an advantage insofar as weight over another conventional one of analogous characteristics. Said weight advantage lies in a 36% reduction approximately; in other words and as any expert knows, while a conventional free wheel constructed of ferrous materials weights 380 grs. approximately, another free wheel according to the invention constituted on the basis of DURAL and with the characteristics indicated herein, does not weigh as much as 245 grs. Naturally, this feature is important to consider, particularly from the point of view of professional cycling, in which such a considerable reduction in weight of a part which, notwithstanding, does not lose its necessary degree of resistance, is to be kept in mind.

It is considered unnecessary to be more exhaustive in this description for any person expert in the matter will understand perfectly the idea to be patented and the advantages to be derived from its execution.

In view of the foregoing and in order to avoid possible imitations, this petition is submitted requesting exclusive exploitation of the idea described according to the considerations and points it is desired to claim which are specified in the following pages:

1. A free wheel device for a multiple speed, chain driven bicycle comprising a hub, a plurality of balanced, annular sprockets of different diameters and uniform widths having different numbers of sprocket teeth and adapted to be mounted on said hub by axially sliding them thereon, an end sprocket threaded on an end of said hub in side-by-side relation, and a plurality of keyed zones connecting the axially slidably mounted sprockets and the hub to prevent the said sprockets from turning on the hub, each keyed zone including a longitudinally extending channel in the hub and a rib formed on the inner periphery of the sprocket and accommodated in said channel, each of the axially slidably mounted sprockets gradually increasing in thickness uniformly on opposite surfaces of a center plane through the sprocket perpendicular to the axis of the hub from a zone beneath the base of the teeth to a maximum thickness, thereby providing a balanced sprocket having substantially identical oppositely disposed surfaces, which uniform thickness locates the position of the outer periphery of each sprocket in the assembly on the hub and provides the standard separation between the sprockets of a free wheel device for multiple speed bicycles, said distance permitting the chain to be displaced from one sprocket to an adjacent one.

* * * * *